United States Patent [19]

Cook

[11] Patent Number: 4,536,197
[45] Date of Patent: Aug. 20, 1985

[54] PROCESS AND APPARATUS FOR REMOVING ADSORBED MATERIAL FROM AN ADSORBER

[76] Inventor: Thomas E. Cook, 3570 Maize Rd., Columbus, Ohio 43224

[21] Appl. No.: 532,835

[22] Filed: Sep. 16, 1983

[51] Int. Cl.$^3$ .............................................. B01D 53/04
[52] U.S. Cl. .......................................... 55/28; 55/59; 55/74; 55/180; 55/208; 55/387
[58] Field of Search .................. 55/25, 26, 28, 31, 33, 55/35, 59, 62, 74, 75, 179, 180, 208, 387, 389

[56] References Cited

U.S. PATENT DOCUMENTS

| | | | |
|---|---|---|---|
| 2,570,974 | 10/1951 | Neuhart | 55/31 X |
| 2,675,089 | 4/1954 | Kahle | 55/62 |
| 2,790,505 | 4/1957 | Dow | 55/62 X |
| 2,995,208 | 8/1961 | Hachmuth et al. | 55/62 X |
| 3,230,689 | 1/1966 | Hussmann | 55/28 |
| 3,712,027 | 1/1973 | Hasz | 55/62 X |
| 3,866,428 | 2/1975 | Simonet et al. | 55/75 X |
| 4,030,896 | 6/1977 | Wimber et al. | 55/62 X |
| 4,146,372 | 3/1979 | Groth et al. | 55/33 |
| 4,414,003 | 11/1983 | Blaudszun | 55/28 X |
| 4,421,532 | 12/1983 | Sacchetti et al. | 55/28 |

FOREIGN PATENT DOCUMENTS

| | | | |
|---|---|---|---|
| 348006 | 5/1931 | United Kingdom | 55/59 |
| 398010 | 9/1933 | United Kingdom | 55/59 |
| 477657 | 1/1938 | United Kingdom | 55/59 |

*Primary Examiner*—Robert Spitzer
*Attorney, Agent, or Firm*—William V. Miller

[57] ABSTRACT

The invention provides an energy-efficient process and apparatus for removing adsorbed material, such as organic solvents, from an adsorber. In a first step, heat from a heat storage means is used to desorb both the adsorber and an auxiliary adsorber. Once the auxiliary adsorber is desorbed and cooled, desorption of the adsorber continues as the solvent is removed in a condensing system. Once the adsorber has been thoroughly heated, the flow of gas therethrough is reversed, thereby transferring heat back to the thermal regenerator and effecting further desorption from the main adsorber, the material thus desorbed being captured in a condensing system and in the auxiliary adsorber.

15 Claims, 1 Drawing Figure

PROCESS AND APPARATUS FOR REMOVING ADSORBED MATERIAL FROM AN ADSORBER

FIELD OF THE INVENTION

This invention relates to a process and apparatus for removing adsorbed material from an adsorber. More particularly, it relates to a process and apparatus for removing adsorbed material, typically an organic solvent, from an adsorber in an energy-efficient manner.

BACKGROUND OF THE INVENTION

Adsorbers are widely used commercially for removing various contaminants, especially organic solvents, from gas and liquid streams. Such gas or liquid streams are frequently waste gases and waste liquors, the purpose of the adsorbers being to recover potentially toxic materials from such waste streams before they are discharged into the environment. The use of such adsorbers has greatly increased in recent years because of increasingly stringent pollution control regulations, and the rapid increase in cost of hydrocarbon solvents. Such adsorbers are utilized to remove potentially toxic materials from waste streams thereby allowing the stream to be discharged into the environment once the toxic materials have been reduced to concentrations that are in accordance with pollution control regulations. Additionally, such adsorbers permit the recovery and recycle of the adsorbed materials which are often relatively expensive solvents.

Typically, an adsorber unit comprises a mass or bed of activated carbon or similar material capable of adsorbing a contaminant from the stream of gas or liquid as it is passed through the adsorber. The contaminant is adsorbed onto the surface of the activated carbon or similar material and thus gradually builds up within the adsorber until the activated carbon or similar material becomes saturated with the contaminant. The process of adsorption is a mass transfer process in which the adsorbent material becomes saturated first at a location near the inlet to the adsorber unit while the adsorbent material near the outlet remains essentially unaffected by the contaminant. At a point between the inlet and the outlet of the adsorber unit, the mass transfer takes place in a mass transfer zone, this zone gradually moving from the inlet toward the outlet end of the adsorber unit. When the leading edge of the mass transfer zone reaches the outlet of the adsorber unit, this condition is referred to as break-through and at this point the adsorber bed can no longer effectively perform its function. It is then necessary to desorb the contaminant in order that the adsorber can again be used.

In most prior art systems, desorption of the adsorbed material from the adsorbent is effected by passing steam through the adsorber unit. Although steam is effective in removing most adsorbed materials, steam desorption has the disadvantage of involving very high energy consumption. Although the theoretical energy consumption for desorption is equal to the latent heat of the adsorbed material, which is typically only 100–200 BTU/pounds (55–110 calories per gram), in practice the energy consumption of prior art systems is 30 to 50 times as great. A large amount of energy consumed is used to generate the steam, and nearly all the energy used in generating steam is lost because the mixture of steam and contaminant leaving the adsorber has to be condensed to recover the contaminants, with simultaneous condensation of the steam. Only a small portion of the total energy utilized in generating the steam is actually consumed in vaporizing the adsorbate from the surfaces of the adsorbent. Not only does the large energy consumption in generating steam add to the cost of operating a steam-desorbed apparatus, but the large quantities of energy which have to be removed during condensation of the mixture of contaminant and steam require the handling of large quantities of cooling water, thereby requiring cooling towers, water treatment plants, etc., which add considerably to the capital cost of the adsorber system.

Steam desorption has other disadvantages. Most steam-desorbed prior art apparatus requires saturated steam and thus the desorption temperature is limited to 212° F. (100° C.) unless the extra cost of building a plant capable of operating at super-atmospheric pressures is incurred. Also, steam can be a relatively corrosive medium and its use may require the use of more expensive materials of construction for the adsorption apparatus than would otherwise be necessary. Finally, steam has the disadvantage that many of the contaminants to be recovered during desorption are miscible in at least some degree with water. In such cases, when it is desired to reuse the desorbed material, further processing will be necessary to separate the mixture of water and desorbed material recovered from the condenser.

Some of the disadvantages attendant upon steam desorption can be overcome by using an inert non-condensible gas for desorption in place of steam. (The term "non-condensible gas" is used herein to mean a gas which condenses only at temperatures substantially below those encountered in adsorption apparatus, so that no attention need be paid to the possibility of condensation of the gas during operation of the adsorption apparatus.) This gas is usually nitrogen or carbon dioxide. The use of a non-condensible gas as the desorbing medium avoids the large loss of latent heat attendant upon the condensation of steam, the expense of apparatus for handling large quantities of cooling water and the need for corrosion-resistant materials in the system. However, even prior art non-condensible gas-desorption systems have energy consumption which are much greater than the theoretical. Although attempts have been made to reduce the energy consumption of such systems by simple recuperative heat exchange, the periods when heating and cooling of various portions of the apparatus are necessary do not usually coincide, so that simple heat exchange is not a complete solution to the problem.

There is thus a need for a process and apparatus for removing the adsorbed material from adsorbers which has lower energy consumption than prior art systems.

SUMMARY OF THE INVENTION

A process for removing adsorbed material from an adsorber in which the initial conditions at the beginning of a desorption cycle are the adsorber in a "cold" condition and a heat storage tank being in a "hot" condition. A stream of non-condensible desorption gas is successively passed over the heat storage tank internal and then on to the adsorber. In this way, heat is transferred from the heat storage tank to the adsorber and in the process the adsorbed contaminants in the adsorber unit are volatilized into the desorption gas and are removed from the adsorber. The now contaminant (adsorbate) desorption gas is passed through a condenser separator unit so that the adsorbate may be removed from the desorption gas and recovered. After the desorption cycle is basically completed, the condition of the system is such that the adsorber is "hot" and the heat storage tank is "cold". At this point a second portion of the process occurs in which the desorption gas is reverse flowed through the system beginning at the adsorber flowing backwards through the adsorber relative to the previous direction of the desorption gas and then on to the heat storage tank. In this way, the heat is transferred from the adsorber back to the heat storage tank. The process additionally contains apparatus for making up the heat differences for the heat lost during the different heat transfer portions of the cycle. Additionally, an auxiliary adsorber is utilized in the reverse flow second step of the process to remove any residual adsorbate from the desorption gas thereby enhancing the adsorbate removal from the primary adsorber bed.

BRIEF DESCRIPTION OF THE DRAWING

The accompanying drawing is a schematic diagram of a preferred embodiment of the instant apparatus.

DESCRIPTION OF THE PREFERRED EMBODIMENT

Figure 1:
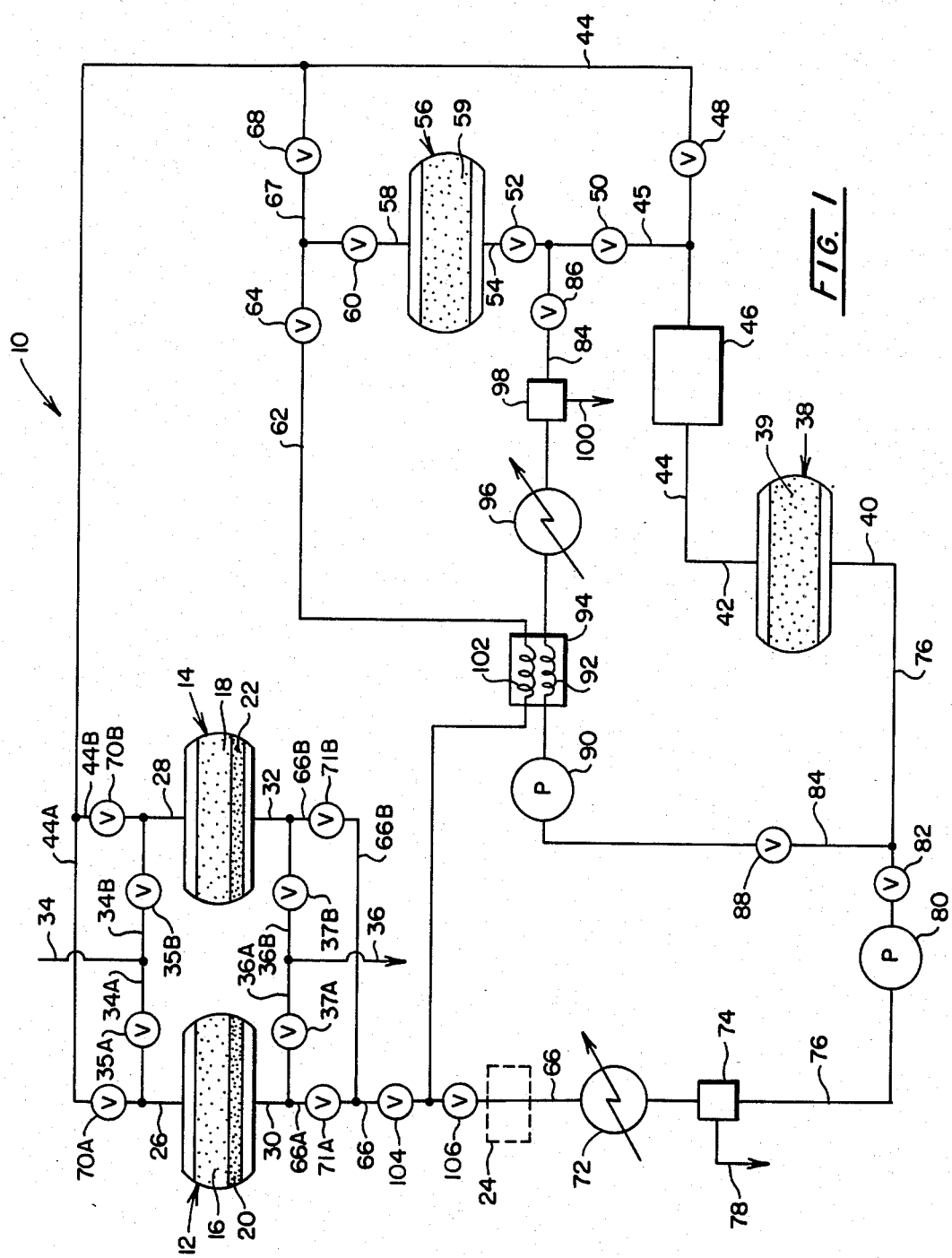

The instant process for removing adsorbed material (desorption) from an adsorber comprises several distinct steps which must be performed in the given order. While the preferred embodiment will include an auxiliary adsorber and auxiliary condensing units as further described below, one of the primary features of the present invention is that of efficient heat recovery. Therefore, the process will be fully described as a heat recovery process with the addition of desorption and further heat transfer enhancement elements being added subsequent to the initial discussion. At the beginning of the first step, the adsorber is at its normal adsorption temperature (usually around ambient temperature), which is the coolest temperature which the adsorber will normally achieve during the desorption process. Thus, at the beginning of the desorption process the adsorber may be regarded as "cold". At the same time, a first heat storage tank is hot (i.e., at its maximum working temperature).

Additionally, the process is preferably operated as a closed cycle process for the purposes of conserving the inert, non-condensible gas. While it will be appreciated that some outside source of inert gas may be utilized and fresh inert gas be made available at each step of the process, reusing the gas is clearly the most efficient method. The non-condensible gas is passes first through the first heat storage tank which is preferably a pebble bed heat exchanger and upon exiting the first heat storage tank, proceeds to the inlet of the adsorber that is the subject of the desorption process. The desorption gas then proceeds through the bed and through a second heat storage tank exiting the adsorber at its normal outlet. The now adsorbate laden gas is cooled by a first condenser. The condensed products being separated from the non-condensible gas stream. It will be appreciated that the condensing apparatus is only required if in fact the non-condensible desorption gas being used in desorption is to be reutilized by passing it back through the first heat storage tank.

The heat transfer that occurs from the pebble bed of the first heat transfer tank to the non-condensible gas operates in a non-steady state way, the desorption gas tending to remove heat from the leading gas of the pebble bed first and not removing heat from the trailing edge of the bed. This is akin to a moving zone of heat transfer wherein the zone of heat transfer progressively moves through the bed from the inlet to the outlet or from its cold side to its hot side. Such a moving zone of heat transfer is analogous to the moving zone of mass transfer which occurs in an activated carbon bed during an adsorption process. The concepts of moving zone of heat transfer and moving zone of mass transfer are well-known to those familiar with the art of heat and mass transfer processes.

Therefore, it will be obvious that the sizing of the various pieces of equipment, specifically the first heat transfer storage tank and the adsorber bed itself are sensitive to the requirements of moving zone of heat transfer and moving zone of mass transfer process design requirement. The second heat storage tank is likewise a pebble bed type heat storage device and may be utilized as a separate heat storage tank or may be incorporated into the support structure of the adsorbent bed of the adsorber. The purpose of the second heat storage tank is to prevent break-through of the moving zone of heat transfer upon heating of the adsorbent bed with the subsequent loss of heat from the process, heat being carried by the non-condensible gas and removed permanently by the condenser. Additionally, the break-through of heat from the adsorber would require increased sizing requirements to the condenser as well as the inefficiencies attendant to the permanent loss of heat from the process. Therefore, at the end of the basic desorption cycle above described, the first heat storage tank will be essentially cool, with the exception of a temperature gradient at the outlet end and the adsorbent bed will be fully heated, the heated zone extending into the second heat storage tank with the temperature gradient from hot to cold existing within the second heat storage tank. It will be appreciated that other heat storage internals may be utilized so long as the concept of a moving zone of heat transfer is adhered to.

The basic desorption process now being completed, the heat that has been transferred into the adsorber is now to be recovered and returned to the first heat storage tank. This is accomplished by reverse flow of the same non-condensible inert gas through the adsorber bed, the desorption gas being cool as it enters the bottom of the adsorber and being heated by the hot adsorbent, a moving zone of heat transfer moving from the outlet toward the inlet of the adsorber, the heated desorption gas then proceeding to the outlet of the first heat storage tank and depositing its heat in the pebble bed of that tank. The desorption gas emerging from the first heat storage tank via its inlet (as described in the first step of the process) and proceeding by recycle back to the inlet of the adsorber.

It will be appreciated in both of these heat transfer steps that there will be attendant losses due to the differential temperature requirements between the pebble beds and the non-condensible gas on the one hand and the temperature differential that must exist between the adsorbent material and the non-condensible gas. These differential temperatures represent heat that cannot be moved from point to point within the cycle, heat which must be made up by an auxiliary heater. Therefore, an auxiliary heater is preferably located in the ductwork connecting the outlet of the first heat storage tank to the inlet of the adsorber. In this way, make up heat can be added as required in order to heat the adsorbent bed initially and also can be added in the reverse flow cycle to bring the pebble bed, first heat storage tank back to its full operating temperature for the next desorption cycle.

As a further means of increasing the thermal and desorption efficiencies of the cycle, an auxiliary adsorber bed is added to the system and located in the reverse flow line from the inlet of the first heat storage tank to the outlet of the adsorber unit. In this way, any adsorbate that is transferred from the adsorber bed to the desorption gas during the portion of the cycle where heat is transferred from the adsorber back to the first heat storage tank may be efficiently removed thereby producing a reverse flow desorption gas that is relatively free of the adsorbate and capable of easily receiving by mass transfer adsorbate that remains in the adsorbent bed. Such an additional auxiliary adsorber bed of relatively small size has the affect of enhancing the desorption of the main adsorber bed thereby allowing it to operate longer and more efficiently in the removal of materials during its standard adsorption cycle when it is operating on the main waste stream.

Additionally, it has been found to be advantageous to install an auxiliary condenser and separator unit in the duct that extends from the inlet of the first heat storage tank to the inlet of the auxiliary adsorber to remove additional adsorbate from the reverse flow heat recovery gas cycle.

Since the auxiliary adsorber will itself become saturated with adsorbate it is necessary to make provision for the regeneration and desorption of the auxiliary adsorber. Such desorption of the auxiliary adsorber is conveniently accomplished at the beginning of the desorption process of the main bed. Therefore, the preferred process comprises three separate steps which are described as follows:

In the first step of the process a stream of non-condensible gas (which should of course be inert to the materials used in the apparatus so as to avoid explosive concentrations, and which is conveniently nitrogen, and hereinafter called "gas") is passed successively through the first heat storage tank, the auxiliary adsorber and in one direction through the adsorber. Heat is thus transferred from the first heat storage tank to both the auxiliary adsorber and the adsorber. As the auxiliary adsorber heats up, at least part of the material adsorbed thereon is desorbed and carried away in the stream of gas (such adsorbate is residual from the previous desorption cycle); naturally, it is desirable to operate the instant process in such a manner that substantially complete desorption of the auxiliary adsorber takes place. Similarly, as the adsorber (which may hereinafter be referred to as the main adsorber) heats up, desorption of adsorbed material therefrom begins. The hot, adsorbate laden gas leaving the main adsorber is passed through the second heat storage tank and cooled, then passes to a condensing means to condense at least part, and preferably substantially all, of the adsorbed material (adsorbate) carried by the gas. After passing through the condensing means, the gas will normally be recycled to the first heat storage tank and carried through a further cycle.

Once the auxiliary adsorber has been heated sufficiently to produce the required degree of desorption therefrom, the instant process enters its second step, in which the auxiliary adsorber is isolated from the stream of gas in order to permit the auxiliary adsorber to cool. The gas continues to pass through the first heat storage tank, the main adsorber and the condenser, so that cooling of the first heat storage tank, heating of the main adsorber, desorption of adsorbed material therefrom and condensation of the adsorbed material therefrom and condensation of the adsorbed material in the condensing means continues. Isolation of the auxiliary adsorber from the gas stream during the second step of the process is necessary since if the auxiliary adsorber is not isolated when cooling it may adsorb sufficient material to reduce its usefulness in the third step of the process.

When the auxiliary adsorber has cooled to a temperature which allows for efficient adsorption therein and the main adsorber has been heated to a temperature sufficient to produce the desired degree of the desorption therefrom, the instant process enters its third step. In this third step, a stream of desorption gas is passed in the opposed direction through the main adsorber and thence through the first heat storage tank and the auxiliary adsorber. Since the main adsorber is now hot, the gas passing through the main adsorber picks up heat therefrom, and also picks up a quantity of adsorbed material from the residue of the adsorbed material which still remains on the main adsorber. The heated gas from the main adsorber passes through the first heat storage tank, giving up heat to the first heat storage tank and then passes through the auxiliary adsorber, where at least part and preferably substantially all, of the material desorbed from the main adsorber is readsorbed. The gas will then normally be recycled to the main adsorber and passed through a further cycle. Eventually, all possible will have been removed from the main adsorber and been desorbed to the desired extent and cooled to a temperature at which it adsorbs efficiently, the main adsorber is now ready for a further adsorption phase. Also, since the heat given up by the main adsorber during cooling to its adsorption temperature has been stored in the first heat storage tank, this heat is not washed but instead is available for a later desorption cycle.

In the third stage of the instant process, after the desorption gas has passed through the first heat storage tank but before it has passed through the auxiliary adsorber, the gas is preferably passed through an auxiliary condensing means to condense at least part of the material desorbed from the main adsorber. Also preferably in the third step of the instant process, to prevent excessive heating of the auxiliary adsorber (which would reduce adsorption efficiency), heat exchange is effected between the desorption gas passing from the heat storage means to the auxiliary adsorber and gas being recycled from the auxiliary adsorber to the main adsorber.

It will be appreciated that the instant method can be practiced with a conventional adsorber assembly having several separate adsorbers which are desorbed in turn, the adsorbers not being desorbed at any particular time being used for adsorption. Only a single first heat storage tank and auxiliary adsorber need be provided, since by the use of appropriate valves (of types that will be familiar to those skilled in the art) the first heat storage tank and auxiliary adsorber can be connected to each adsorber in turn.

The preferred embodiment of the instant apparatus, generally designated 10, shown in the accompanying drawing comprises a main adsorber assembly comprising adsorbers 12 and 14. (For simplicity, the instant apparatus is illustrated and described in a form having only two main adsorbers and in which, at any particular time, one of these adsorbers is being used for adsorption while the other is being desorbed. Commercial forms of the instant apparatus will of course normally have more than two adsorbers, depending upon the through-put of material to be desorbed, and usually at any given time the majority of the adsorbers will be in use for adsorption purposes with only one, or possibly two, of them being desorbed. However, the necessary changes in ducting and valving arrangements to adapt the apparatus shown in the accompanying drawing to any particular number of adsorbers and any particular choice of numbers of adsorbers to be used at any one time for adsorption and desorption will readily be apparent to those skilled in the art.) Each of the main adsorbers 12 and 14 comprises a bed (16 or 18 respectively) of adsorbent charcoal or similar adsorbing material, this bed being carried on a support (20 and 22 respectively). The bed supports 20 and 22 are designed to have a substantial heat capacity and act as the second heat storage tank. (Alternatively, the bed supports 20 and 22 may be made relatively thin and of low heat capacity, and a separate second heat storage tank 24 (shown in broken lines in the drawing) disposed in a connecting duct 66 as described below.)

The adsorbers 12 and 14 have inlets 26 and 28 respectively at their upper ends and outlets 30 and 32 respectively at their lower ends. Contaminated gas containing material (e.g. an organic solvent such as n-octane) to be adsorbed is fed to the adsorbers 12 and 14 from an adsorber inlet duct 34 having branches 34A and 34B connected to the adsorber inlets 26 and 28 respectively. The inlet branches are respectively isolatable by valves 35A and 35B. The adsorber outlets 30 and 32 respectively are connected to branches 36A and 36B respectively of an adsorber outlet duct 36 which serves to exhaust desorbed gas from the outlets of the adsorbers, the outlet branches are respectively isolatable by valves 37A and 37B.

The instant apparatus shown in the drawing further comprises a first heat storage tank in the form of a thermal regenerator 38 comprising a bed 39 of inert material such as pebbles; the thermal regenerator 38 has an inlet 40 at its lower end and an outlet 42 at its upper end. A desorption duct 44 extends from the outlet 42 of the thermal regenerator 38 via an auxiliary heater 46 and branches into heater duct 45, when desorption duct 44 is blocked by valve 48 and valve 50 is open. Heater duct 45 extends through valve 52 to an inlet 54 disposed at the lower end of an auxiliary adsorber 56 having an outlet 58 at its upper end. The auxiliary adsorber 56 may be generally similar to, but in practice smaller than, the main adsorbers 12 and 14 and comprises a bed 59 of adsorbent carbon or similar adsorbent material.

The outlet 58 of the auxiliary adsorber is isolable by valve 60 after which it branches to first cooling duct 62 which is isolable by valve 64 and to auxiliary desorber duct 67 which is isolable by valve 68. Auxiliary desorber duct 67 then rejoins desorber duct 44 which has continued around the auxiliary adsorber as a bypass. Desorber duct 44 extends to the inlets 26 and 28 of main adsorbers 12 and 14 respectively. Adjacent the adsorber assembly, the desorption duct 44 forks into branches 44A and 44B isolable respectively by valves 70A and 70B, the branch 44A joining the branch 34A of the adsorber inlet duct 34 adjacent the inlet 26 to the main adsorber 12, and the branch 44B joining the branch 34B adjacent the inlet 28 of the main adsorber 14.

A connecting branch 66A forks from the branch 36A of the adsorber outlet duct 36 adjacent the outlet 30 of the main adsorber 12, while a branch 66B similarly forks from the branch 36B adjacent the outlet 32 of the main adsorber 14. The branches 66A and 66B join to form a connecting duct 66, and are isolable by valves 71A and 71B respectively. The optional auxiliary heat storage means 24 may, if provided, be located in this connecting dust 66 rather than being located at the bed supports of adsorbers 12 and 14. The connecting duct 66 connects the outlets 30 and 32 of the main adsorbers 12 and 14 respectively to the inlet of a condensing means. The condensing means comprises a condenser 72, capable of condensing contaminant desorbed from the main adsorbers 12 and 14, and a gas-liquid separator 74. The gas-liquid separator 74 is arranged to pass its desorption gas output along the return duct 76 and to provide its liquid output along a branch line 78 from which the liquid material recovered may be either recycled to the appropriate process or treated for disposal. Also disposed in the return duct 76 are a first impeller 80, which is used for forcing gas from the outlets 30 and 32 of the main adsorbers 12 and 14 respectively to the inlet 40 of the thermal regenerator 38; and a valve 82 which is for isolating the return duct from the second cooling duct 84 described below.

It wll be apparent to those skilled in the art that it is necessary to provide an appropriate valve means to ensure that contaminated gas will flow from the adsorber inlet duct 34 through one of the main adsorbers 12 and 14 to the adsorber outlet duct 36, while gas flow is achieved through the other of the main adsorbers 12 and 14 between the recycle duct 66 and the desorption duct 44, arrangements being made to ensure that the main adsorbers 12 and 14 can be connected alternately to the adsorber inlet and outlet ducts 34 and 36 respectively. The minimum necessary valves have been located in the preceding discussion and their sequence of operation is apparent to those skilled in the art.

Second cooling duct 84 extends from a point on the return duct 76 between the valve 82 and the inlet 40 of the thermal regenerator 38 to a point on the heater duct 45 between the valves 50 and 52, being isolable from the heater duct by valve 86 and from the return duct 76 by valve 88; thus, second cooling duct 84 connects the outlet 40 of the thermal regenerator 38 to the inlet 54 of the auxiliary adsorber 56. In second cooling duct 84 are also disposed a second impeller 90 (which is used for forcing gas from the inlet 40 of the thermal regenerator 38 to the inlet 54 of the auxiliary adsorber 56), a first coil 92 of a heat exchanger 94 and an auxiliary condensing means comprising a condenser 96, capable of condensing contaminant desorbed from the main adsorbers 12 and 14, and a gas-liquid separator 98. The gas-liquid separator 98 operates in a manner similar to the separator 74, passing its gas output along the first cooling duct 84 and its liquid output along a branch 100 which permits recycle or disposal of the condensed densed desorbed material. First cooling duct 62 extends from a point on the duct 67 between the valves 60 and 68 via a valve 64 and the second coil 102 of the heat exchanger 94 to the end of the connecting duct 66 adjacent the main adsorbers 12 and 14, and between isolation valves 104 and 106 in connection duct 66. Thus, this second reheating duct 102 connects the outlet 58 of the auxiliary adsorber 56 to the outlets 30 and 32 of the main adsorbers 12 and 14 respectively.

From the foregoing description of the instant apparatus and process, it will be seen that the process is extremely energy efficient since, unlike prior art processes, the energy removed from the main adsorber during the cooling of this main adsorber necessary to prepare it for a further adsorption phase is not lost to the system but instead is stored in the thermal regenerator 38 ready for use in a further desorption cycle. Furthermore, the heat exchanger 94 minimizes loss of energy in the condenser 96.

The use of inert gas as the desorbing medium in the instant process allows the process to be operated with desorbing temperatures substantially in excess of 100° C. without requiring either super-heating of steam or use of saturated steam at super-atmospheric pressures. The increase in desorption temperature thus obtained allows more complete desorption of the main adsorbers 12 and 14, thereby increasing the quantity of material which can be adsorbed onto unit weight of the adsorbent bed 16 during each adsorption phase. For example, calculations show that when the material to be adsorbed is n-octane, for each 100 parts by weight of adsorbent carbon in the main adsorbers 12 and 14, the quantity of n-octane which can be adsorbed on each adsorption cycle is 6.0 parts by weight at a desorption temperature of 100° C., 9.0 parts by weight at a desorption temperature of 125° C., and 11.8 parts by weight at a desorption temperature of 150° C., assuming a temperature in the condenser 68 of 25° C. Similarly, for a condenser temperature of 2.2° C., for each 100 parts by weight of adsorbent carbon, the figures are 9.0 parts by weight at a desorption temperature of 100° C., 11.0 parts by weight at a desorption temperature of 125° C., and 14.6 parts by weight at a desorption temperature of 150° C. The extra cost involved in heating the inert gas to 150° C. is negligible compared to the added cost of a system to refrigerate the cooling water used in the condenser 68. Furthermore, assuming a condenser temperature of 25° C., increasing the desorption temperature from 100° to 150° C. virtually doubles the weight of material adsorbed per part by weight of adsorbent carbon in the main adsorbers 12 and 14, thereby either reducing the quantity of adsorbent carbon required by half or doubling the length of the adsorption phase, thus greatly reducing heat loss and increasing carbon life.

The heat exchanger 102 is optional in the apparatus as described above. Eliminating the heat exchanger 102 reduces the energy efficiency of the apparatus. Such a simpler system may be acceptable for some types of adsorbed material, especially if they are low in cost so that recovery of the adsorbed material is not a primary consideration and/or are presently in relatively low concentrations in the gas being desorbed so that smaller adsorption capacity in the main adsorbers is acceptable. However, providing the auxiliary condensing means will typically increase the capacity of the main adsorbers by 25 to 50 percent.

It will be apparent to those skilled in the art that numerous changes and modifications may be made in the preferred embodiment of the invention described above without departing from the scope of the invention. Accordingly, the foregoing description is to be construed in an illustrative and not in a limitative sense, the scope of the invention being defined solely by the appended claims.

I claim:

1. A process for removing adsorbed material from an adsorber comprising:
    (a) passing a stream of non-condensible gas successively through a heat storage means, an auxiliary adsorber and in one direction through a main adsorber, thereby transferring heat from said heat storage means to said auxiliary adsorber and said adsorber, removing at least part of any adsorbed material from said auxiliary adsorber and at least part of said adsorbed material from said main adsorber, said gas leaving said main adsorber being passed through a condensing means to condence at least part of said adsorbed material carried by said gas;
    (b) thereafter passing said stream of gas successively through said heat storage means, said main adsorber thereby continuing to transfer heat from said heat storage means to said main adsorber and to remove adsorbed material from said adsorber, while isolating said auxiliary adsorber from said stream of gas, thereby permitting said auxiliary adsorber to cool and
    (c) passing said stream of desorption gas successively in the opposed direction through said main adsorber through said heat storage means and through said auxiliary adsorber, thereby transferring heat from said main adsorber to said heat storage means and adsorbing at least part of any of said adsorbed material removed from said main adsorber in said auxiliary adsorber.

2. A process according to claim 1 wherein in Step (c), after said gas has passed through said heat storage means but before it is passed through said auxiliary adsorber, said gas is passed through an auxiliary condensing means to condense at least part of any of said adsorbed material carried by said gas.

3. A process according to claim 2 wherein, after passing through said auxiliary adsorber, said gas is recycled to said main adsorber and wherein heat exchange is effected between said gas passing from said heat storage means to said auxiliary adsorber and said gas being recycled from said auxiliary adsorber to said main adsorber.

4. A process according to claim 1 wherein in Step (a), said stream of gas is heated by passing it through an auxiliary heating means after said gas has passed through said heat storage means but before said gas passed through said auxiliary adsorber.

5. A process according to claim 1 in which (b) includes passing the desorption gas stream through condensing means for the adsorbed material intermediate said main adsorber and said heat storage means to condense at least part of said adsorbed material.

6. A process according to claim 1 in which (a) includes passing the desorption gas through a second auxiliary heat storage means located intermediate said main adsorber and said first condensing means thereby preventing the breakthrough of heated desorption gas from said main adsorber to be lost from the process by said first condensing means.

7. A process according to claim 6 wherein heat transfer in said main adsorber and said first heat storage means utilizes a moving zone of heat transfer within the bed of said means.

8. An adsorption apparatus comprising:
    (a) a main recycling circuit including:
        a main adsorber having an inlet and an outlet;
        an adsorber inlet duct for passing a stream of contaminated gas into said inlet of said adsorber;
        an adsorber outlet duct for exhausting said stream of gas from said outlet of said adsorber;
        a heat storage means having an inlet and an outlet;
        an auxiliary adsorber having an inlet and an outlet;

a first desorption duct extending from said outlet of said heat storage means to said inlet of said auxiliary adsorber;

a second desorption duct extending from said outlet of said auxiliary adsorber to said inlet of said main adsorber;

a third desorption duct for passing gas from said outlet of said heat storage means to said inlet of said main adsorber without passing said gas through said auxiliary adsorber;

a first valve means for controlling the flow of gas through said first, second and third desorption ducts, said first valve means having a first position in which said third desorption duct is closed so that gas can only pass from said outlet of said heat storage means to said inlet of said main adsorber via said auxiliary adsorber, and a second position, in which said third desorption duct is open and at least one of said first and second desorption ducts are closed so that gas can pass from said outlet of said heat storage means to said inlet of said main adsorber, but cannot pass through said auxiliary adsorber;

a main condensing means, connected to said outlet of said main adsorber, for condensing condensible matter in gas leaving said outlet of said adsorber;

a second valve means for switching said main adsorber between adsorption and desorption phases; said second valve means having an adsorption position in which gas can flow through said adsorber from said adsorber inlet duct to said adsorber outlet duct but in which gas cannot flow into said adsorber from said second and third desorption duct nor can gas leave said adsorber via said main condensing means; and a desorption position, in which gas can enter said main adsorber from at least one of said second and third desorption ducts and can leave said adsorber via said main condensing means but in which gas cannot enter said adsorber via said adsorber inlet duct nor leave said adsorber via said adsorber outlet duct;

a main impeller means connected to said main condensing means and to said heat storage means to cause the gas to enter and leave the main adsorber when the second valve means is in its desorption position;

(b) an auxiliary recycle circuit between the heat storage inlet and the main adsorber outlet comprising;

a first reheating duct connecting said inlet of said heat storage means to said inlet of said auxiliary adsorber;

a second reheating duct connecting said outlet of said auxiliary adsorber to said outlet of said main adsorber; and a third valve means for opening and closing said first and second reheating ducts.

9. Apparatus according to claim 8 which (b) includes an auxiliary condensing means disposed in said first reheating duct for condensing condensible matter in gas passing therethrough.

10. Apparatus according to claim 9 in which (b) further comprises a heat exchanger for effecting heat exchange between said first and second reheating ducts.

11. Apparatus according to claim 10 in which (a) further comprises a recycle duct extending from said outlet of said main adsorber to said inlet of said heat storage means, said auxiliary condensing means being disposed in said recycle duct.

12. Apparatus according to claim 11 wherein a main circuit impeller for forcing gas from said outlet of said main adsorber to said inlet of said heat storage means is disposed in said recycle duct.

13. Apparatus according to claim 12 wherein an auxiliary heat storage means is disposed in said recycle duct between said main adsorber and said main condensing means.

14. Apparatus according to claim 13 wherein an auxiliary circuit impeller for forcing gas from said inlet of said heat storage means to said inlet of said auxiliary adsorber is disposed in said first reheating duct.

15. Apparatus according to claim 14 further comprising a second main adsorber having an inlet connected to said main adsorber inlet duct and to said second and third desorption ducts and an outlet connected to said first main adsorber outlet duct, to said main condensing means and to said second recycle duct, and wherein said second valve means is arranged, when in said adsorption position, to permit flow of gas from at least one of said second and third desorption ducts into said main adsorber but not to permit flow of gas from said adsorber inlet duct into said second main adsorber nor flow of gas from said second adsorber into said adsorber outlet duct, and, when in its desorption position, to said first main adsorber and flow of gas from said second main adsorber to said condensing means but not to permit flow of gas from second and third desorption ducts into said second main adsorber nor flow of gas from said second main adsorber to said condensing means.

* * * * *